Sept. 5, 1939.   O. E. SZEKELY   2,171,610
VARIABLE RATIO TRANSMISSION
Filed Dec. 30, 1937   4 Sheets-Sheet 1

Inventor
Otto E. Szekely,
By Mason Mason
Attorneys

Sept. 5, 1939.   O. E. SZEKELY   2,171,610
VARIABLE RATIO TRANSMISSION
Filed Dec. 30, 1937   4 Sheets-Sheet 2

Inventor
Otto E. Szekely,
By   Masmorton,
Attorneys

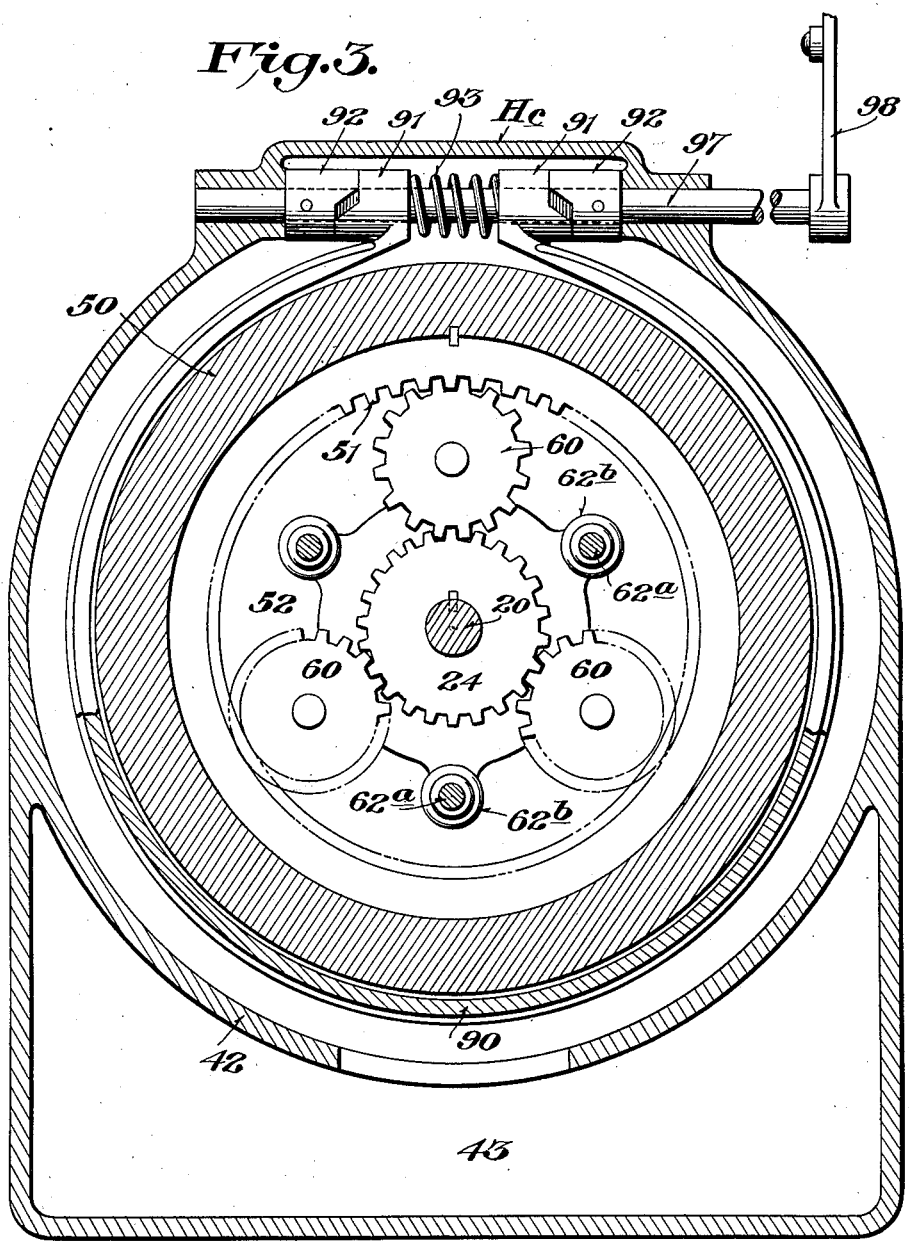

Inventor
Otto E. Szekely,
By
Attorneys

Patented Sept. 5, 1939

2,171,610

UNITED STATES PATENT OFFICE 2,171,610

VARIABLE RATIO TRANSMISSION

Otto E. Szekely, Mount Airy, Pa., assignor to The Szekely Company, Inc., a corporation of New York Application December 30, 1937, Serial No. 182,573

12 Claims. (Cl. 74—293)

This invention relates to improvements in variable ratio transmissions and is concerned with mechanisms by which torque increment effects may be attained under automatic control by the load demand.

One of the features of the present invention is the provision of a structure by which plural ranges of torque ratio transmission may be effected, with inversely corresponding speed ratios, with the employment of a manual control for selecting the actuation in the system.

Another feature of the present invention is the provision of a structure including a plurality of power-transfer devices which may be successively brought into action in accordance with existing relationships of torque delivered by the prime mover and torque demanded by the load, and permitting the operator's control of the actuation effected therethrough.

Another feature of the present invention is the provision of a variable ratio transmission including two differentiating gear sets which are selectively energized and operate under plural conditions of energization for producing variable torque transfers through the structure.

Other features of the invention reside in the construction and arrangement of parts, as will appear more fully hereinafter.

Figure 1:
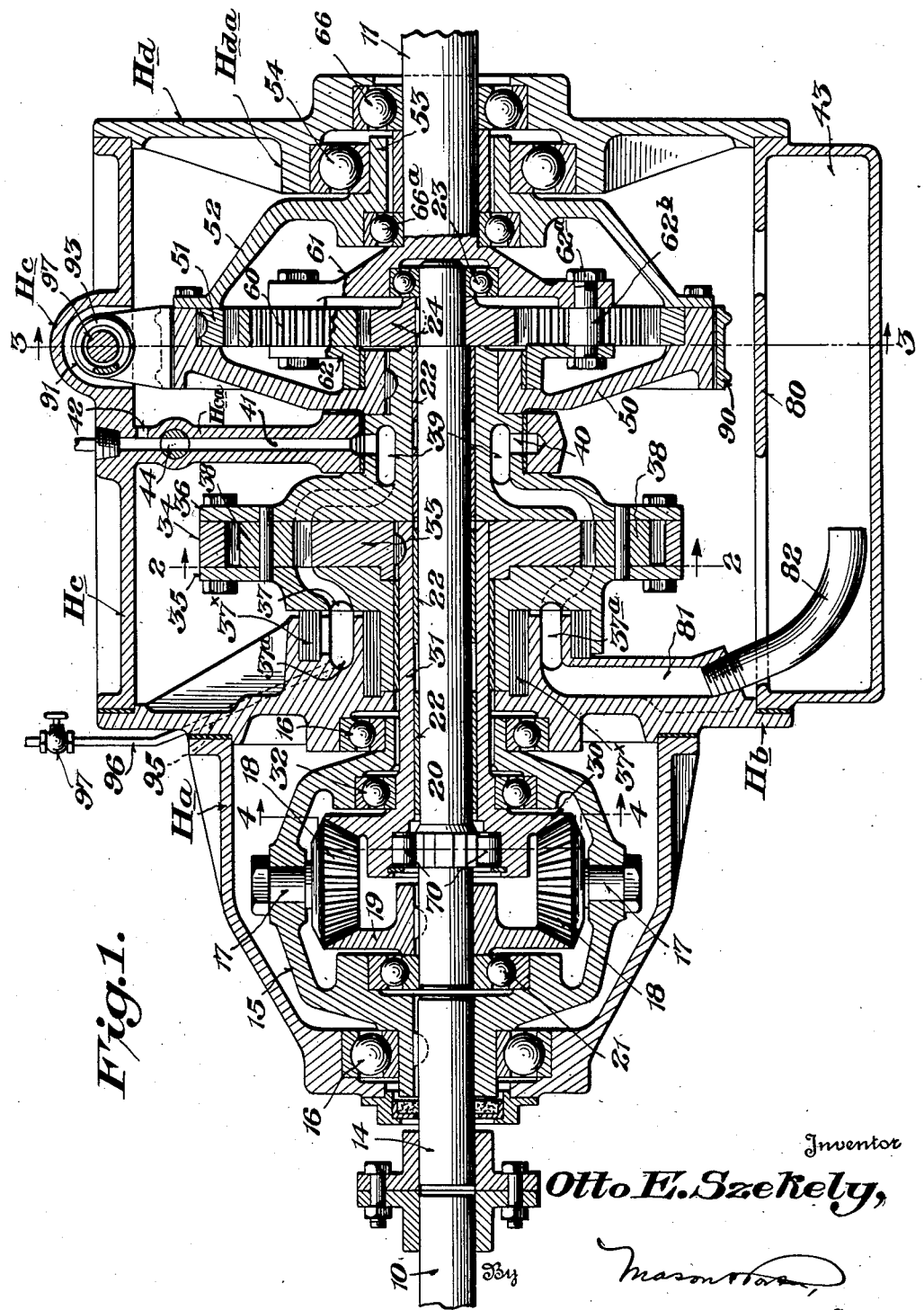
Figure 2:
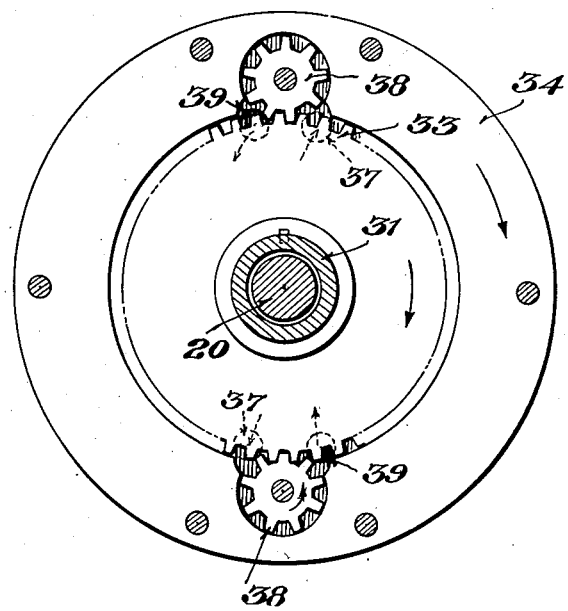
Figure 4:
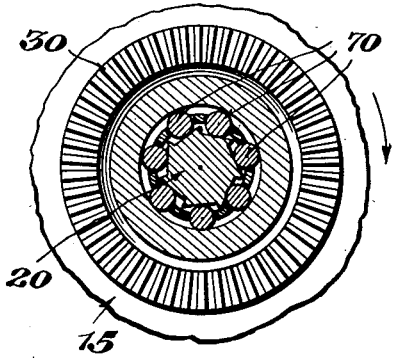

Illustrative forms of practicing the invention are set out in the accompanying drawings, in which:

Figure 1 is a longitudinal upright sectional view through the transmission assembly according to this invention;

Figures 2, 3 and 4 are corresponding transverse sectional views, respectively, taken substantially on the lines 2—2, 3—3 and 4—4 of Fig. 1;

Figures 5, 6, 7 and 8 are fragmentary detail views showing modifications in the construction.

In these drawings, the transmission mechanism is intended for transferring power from the prime mover (not shown) having a shaft 10 or similar member, to a final driven or tail shaft 11 which is coupled to the load to be driven, so that the load places a torque demand upon this shaft 11. The prime mover shaft 10 is shown as connected to the input shaft 14 of the transmission mechanism, which is keyed or otherwise secured to a differential case 15 which is freely rotatable on the anti-friction bearings 16 mounted in the front housing members Ha and Hb.

The differential case 15 has the inwardly extending pivot pins 17 which receive the planet pinions 18. The sun gear 19 is fixed on a shaft 20, this shaft being supported for rotation by the anti-friction bearings 21 disposed between it and the differential case, by the plain sleeve bearings 22, and by further anti-friction bearings 23 at its rear end. The shaft 20 is keyed or otherwise secured to the central gear 24 of an epicyclic train. The second sun-gear 30 in the differential case 15 is provided with a hollow shaft extension 31 which surrounds the shaft 20 and engages the plain bearings 22, and is supported thereby and is also supported by an anti-friction bearing 32 for easy rotation in the differential case 15. The hollow shaft 31 is connected to the central gear 33 of a fluid displacement pump.

This fluid displacement pump includes the housing 34 located between the flanges 35, 36. The flange 35 has a peripheral channel groove 37 in its front face, for cooperation with a similar groove 37a provided in the end member Hb of a central housing portion Hc. The annular passage provided by the grooves 37, 37a is sealed against leakage by labyrinth packings 37x. Within the pump housing 34 are the pump pinions 38 which are mounted to turn about axes which travel with the pump housing assembly while the pinions 38 remain in mesh with the central pump gear 33. Fluid delivered from the pump passes through discharge channels 39 to a peripheral groove 40 formed in the hub of the right-hand flange 36, and thence to a corresponding groove in the web wall Hca of the housing member Hc, and thus gains access to a conduit 41 formed in this web wall, and finally passes back by the conduit 42 into the sump 43 provided by the lower portion of the housing structure. Flow through the conduits 41, 42 may be regulated by a valve 44.

Keyed to the right-hand flange 36 of the pump structure is a member 50 provided with internally-cut teeth 51. The member 50 is fixedly connected to a dished plate structure 52 which has a sleeve 53 which is supported by an anti-friction ball bearing 54 relative to the inwardly extending flange Hda of the housing end plate Hd.

Planet pinions 60 of an epicyclic set are in mesh both with the gear teeth 51 and with the teeth of the central gear 24, and are carried by pivots connected to the carrier spider 61 located at one face of the gears 24, 60 in association with the spider portion 62 located at the other face thereof and connected by the bolts 62a and the spacing collars 62b.

The carrier spider 61 is secured to or formed integral with the final driven shaft 11, and is in supported relation with the shaft 20 by the aforesaid anti-friction bearing 23. The tail or final driven shaft 11 is mounted by anti-friction bearings 66 on the end plate Hd of the general housing, and bearings 66a on the structure 52.

A clutch of the overrunning type (Fig. 4) is provided between the sun gear 30 and the outer surface of the shaft 20, and is made effective by the rollers 70.

The sump 43 is divided from the upper portion of the housing by an apertured partition 80. The channel 37, 37a is in communication by a passage 81 and a duct 82 with this sump space.

The several parts of the housing are secured fixedly together so that it operates to retain the liquid therein. This liquid is usually an oil which is effective without change of physical condition at maximum and minimum temperatures of service.

As shown by Figures 1 and 3, the outer periphery of the member 50 is formed as a drum for receiving a brake band 90 which has the outwardly extending ears 91 provided with camming surfaces for cooperation with corresponding surfaces on the rotatable sleeves 92 which are pinned or otherwise secured to a rock shaft 97. A spring 93 is interposed between the ears 91 for pressing these ears apart. The shaft 97 projects outwardly from the housing and has a crank arm 98 thereon by which it may be rocked whereby to cause the camming surfaces to move the ears 91 toward one another and thereby apply the brake band 90 onto the outer surface of member 50 in order to bring the latter to a standstill; while a movement of the crank 98 in the other direction is employed for permitting the cam surfaces to move relative to one another so that the ears 91 are moved apart by the action of the spring 93 and such inherent resiliency as there may be in the brake band 90, whereby the brake band is released from the member 50 and the latter is free to rotate.

The annular passage provided by the grooves 37, 37a is in communication by a passage 95 and pipe 96, and through the valve 97, with the atmosphere.

The method of operation of the structure is as follows:

When the prime mover is at a standstill, all parts of the transmission are likewise at a standstill, and it may be assumed that the valves 44 and 97 are open. The band brake 90 is released. This permits the usual operations of starting the prime mover if it is a gasoline engine or other device which exerts only a low torque during the starting condition or when moving at very low speed. The shaft 14 turns at the same speed as the shaft 10. Thus, the differential case 15 is likewise driven at this same speed, and the planet pinion pins 17 are carried in rotation about the common axis at this same speed. The overrunning clutch rollers 70 prevent the sun gear 30 from turning faster than the shaft 20, and thus overcome the tendency of the sun gear 30 to be turned at twice the speed of the differential case 15, while the sun gear 19 is held fast by reason of load resistance. Hence, the differential case 15, and the sun gear and planet pinion means providing the first differential gearing, turn as a unit: and the inner pump gear 33 and the small sun gear 24 of the epicyclic or second differentiating gearing are likewise turned therewith: all of these parts are therefore revolving at the speed of the prime mover. The small sun gear 24 produces a pressure upon the planet pinions 60 tending to turn these about their axes. This results in a relatively backward pressure exerted by the planet pinions 60 upon the gear teeth 51. Thus, when the shaft 20 and sun gear 24 are turning in a clockwise direction (Fig. 3), a pressure is being exerted upon the gear teeth 51 tending to force them in a counterclockwise direction, along with the associated structures 50, 52 and the pump housing. The pump housing 34 turns in a retrograde or counterclockwise direction, while the inner pump gear 33 turns in a forward or clockwise direction. The pumping effect draws air through the valve 97 into the annular passage 37, 37a, and free escape is provided through the conduits 39, 41, 42 and valve 44, so that there is substantially no back pressure or drag at the pump structure.

When the prime mover has attained a desired speed, the band brake 90 may be engaged. The aforesaid retrograde movement of gear tooth 51 and structures fixed thereto is now prevented by the band brake 90, and hence there is no retrograde rotation thereof relative to the frame. The pump housing is held at a standstill, but the maintained open condition of valves 97, 44 prevents the creation of back pressures. The planet pinions 60 roll on the gear teeth 51 which are stationary, and the spider 61, 62 is carried along with the sun gear 24, and turns in a clockwise direction for driving the tail shaft 11. The speed ratio between the shafts 10, 14 and 20 (and sun gear 24) with respect to the tail shaft 11 may then be expressed by the formula:

$$\text{Speed of tail shaft } 11 = \text{rpm shaft } 20 \times \frac{E}{E+R}$$

in which E represents the effective diameter of the sun gear 24, and R represents the effective diameter of the gear teeth 51. Thus, if gears 24 and 60 are of the same effective diameter, then gear teeth 51 have an effective diameter three times as great: and then the above equation indicates that the rotational speed of the tail shaft 11 is one-fourth of the rotational speed of the prime mover and of the shaft 20.

The torque ratio may be similarly computed, by the formula:

$$\text{Torque at tail shaft } 11 = \text{engine torque} \times \frac{E+R}{E}$$

and hence the torque at the tail shaft, with the stated relation of the sun gears 24, 51, is four times the torque delivered at the prime mover. It will be noted that the power and energy conditions remain the same, as these are represented by formulas involving the product of speed and torque.

Under the conditions stated, therefore, with the valves 44 and 97 open, a mechanical drive is effected at a definite low speed and at a multiplied torque: this reduction of speed and multiplication of torque being determined by the ratio of the gears 24, 51. This condition occurs even when no oil or other liquid is present in the system. The speed of the tail shaft varies directly with the speed of the engine, and hence the actuation of the load is functionally related directly to the prime mover characteristics of speed and torque. It will be noted, therefore, that this mechanical drive provides for starting a load by engaging the band brake 90, with the delivery of greatly increased torque effects; and is available for propelling a vehicle, for example, even in the event of disruption in the hydraulic system. It may, advantageously, be used under conditions of constant speed and torque at the engine, in propelling an automobile up a steep grade.

If such a vehicle then passes upon a lesser grade, the operator may move the valves 44 and 97 toward closed condition. The gear pump draws liquid from sump 43 and delivers it to valve 44 which retards flow. Back pressure effects are thus set up at the gear pump. When these pressure effects exceed, for example, the tooth pressure effects existing in the first differential and tending therein to rotate the sun gear 30 faster than the shaft 20, a condition corresponding to a variable middle ratio is attained. The inner pump gear 33 is retarded by this back pressure in the gear pump, so that it turns slower than the shaft 20, and therewith the sun gear 30 turns slower than the differential case 15. This occasions a rotation of the planet pinions 18 about their respective axes 17, and therewith causes an increase of the rotational speed of the sun gear 19 with respect to the differential case, so that the shaft 20 now turns faster than the differential case. As before, the shaft 20 rotates the sun gear 24 in the second differentiating gearing, but now at a faster rate. Therefore, an acceleration is imparted to the pinions 60 so that the spider 61 and the tail shaft 11 are driven at a greater rate. Ultimately, under this condition of operation, the back pressure effect in the gear pump may be regarded as retarding the inner pump gear 33 until it is substantially stationary with respect to the pump housing. At this time, the sun gear 30 is substantially stationary. In the form shown in Figure 1, the two sun gears 30, 19 are of the same effective diameter; and hence, under these conditions, the sun gear 19 is rotated at twice the speed of the differential case 15. Since the shaft 20 is now turning at twice the former speed, the 4:1 speed reduction in the second gearing now brings the tail shaft 11 to a speed which is one-half of the speed of the prime mover. Correspondingly, the torque delivered to the tail shaft 11 is twice the torque delivered at the prime mover. Again, the relation of the speed and torque show that the prime mover is continuing to deliver energy at the same constant rate as stated above.

Under these conditions, it will be noted that action and reaction are present in the gear pump, by reason of the back pressure upon the liquid: so that essentially half of the torque is being delivered from the pump housing, through the member 50, to the band brake 90 and thence to the frame, but this torque component has no corresponding speed component, as the parts are at a standstill, and hence no power transfer (save obvious mechanical and hydraulic losses) is occurring in this control portion of the system.

It will be noted that this change from a condition of 4:1 torque ratio and a 1:4 speed ratio, existing at the "low speed" is determined by the setting of the valves 44 and 97, so long as the torque demand on the tail shaft 11 remains constant. Conversely, for a given valve setting, variations in the torque demand upon the tail shaft 11 (as in passing from a steep hill to one of lesser grade) will result in the passage of the system to the aforesaid condition at which the torque ratio is, say, 2:1 and the corresponding speed ratio is 1:2.

If the road passes from the moderate upgrade to a level condition, so that the torque demand drops still lower, then the decrease of load demand permits the engine to speed up in accordance with its own characteristics. This corresponds essentially to driving with a mechanical middle-speed gear. The operator can now release the brake band 90. The reaction pressure in the gear pump is greater than the reaction pressure between the planet pinion 60 and gear teeth 51. The pump structure remains substantially locked or blocked by the back pressure through the liquid, so that its parts will turn at substantially the same speed. The tooth pressures at the pinions 18 now produce a forward rotation of the pump parts and therewith of the members 50, 52. This condition continues with acceleration of the pump housing or members 50 and 52 until these parts are turning at substantially prime mover speed, and therewith the several parts comprised in the first differentiating gearing and also the several parts comprised in the second differentiating gearing turn at this same angular rate. During this acceleration period, there is a further decrease of the torque ratio and increase of the speed ratio until all parts are turning together and at prime mover speed. This represents a direct drive of 1:1 torque ratio and 1:1 speed ratio.

It will be understood that this condition is maintained so long as the load demand exactly corresponds to the output of the engine with respect to both speed and torque. If the prime mover is delivering a greater torque than is demanded by the load at this 1:1 ratio, the prime mover speeds up, in accordance with its own characteristics, until the torque and speed at the prime mover exactly correspond to the torque demand of the load at the identical speed. On the other hand, if the load increases, the ultimate result is a passage from the 1:1 ratio successively to the 2:1 torque ratio and then (if demanded by the load) to the 4:1 torque ratio, along with corresponding decreases of speed, if the prime mover torque and speed remain constant. If the prime mover torque and speed change, it is obvious that similar but not necessarily linearly-corresponding changes occur at the load.

The valves 44 and 97 have been described above with respect to their effects when open as permitting the pump parts to turn substantially without drag relative to one another; and as causing a high back pressure effect to be established at the pump when the valve 97 is closed to prevent the entry of air into the pump intake and when valve 44 is closed to prevent escape of liquid from the pump discharge. The partially opened positions of valve 44 represent greater or lesser back pressure effects in the pump. Partially opened positions of the valve 97 represent the admission of a greater or lesser proportion of air, so that the fluid in the pump is more or less compressible. Thus, these valves serve to determine the smoothness of acceleration and the rate or time period, for given torque conditions, at which passage from one ratio to another will be accomplished. It is possible to employ only one or the other of the valves 44 or 97, and still gain a control of the system. Thus, the valve 44 may be set at a small opening representing a small discharge which is sufficient in volume to permit clearing the pump for idling within the desired time period, and then the valve 97 alone may be moved for attaining the desired rate of transition from one torque condition to another: and, on the other hand, the valve 97 may be left entirely closed, for example, and the position of valve 44 regulated to attain the desired type of control.

The above description indicates a manner of operation of the system. It is also possible to bring the system from a condition of standstill of the load to a condition of direct drive by leaving the band brake 90 disengaged and moving the valves 44 and 97 toward closed position. During the idling condition of the mechanism, as aforesaid, the inner pump gear 33 has been turning forwardly and the pump housing 34 has been turning in a retrograde direction. As back pressures are built up in the pump, the effect is to relatively slow down the speed of each of these pump members, until at a blocking or locking condition they do not turn relative to one another. During the course of this retardation of the gear 33 an acceleration of the sun gear 19 has occurred, by the production of relative rotations of the planet pinions 18 about their pivot pins, and therewith the central gear 24 is accelerated. On the other hand, the reduction in rate of retrograde movement of the pump housing 34 slows the structure 50. Hence, the planet pinions 60 are rolling along the gear teeth 51 and are being driven by the central gear 24, and hence they carry the spider 61 with them and the tail shaft is being accelerated. Ultimately, the conditions of tooth pressures cause the structure 50 to begin turning in a forward direction relative to the frame, and this motion is accelerated under substantially the same conditions as set out above, until all parts of both differentiating gears, as well as the pump parts, are turning in a forward direction and at prime mover speed, representing a direct drive of 1:1 torque ratio and 1:1 speed ratio. Thus, it is possible to pass purely by hydraulic means from an idling to a direct drive condition. In the event of increase of load resistance, while the parts are operating at direct drive, under these conditions, tooth pressure effects cause slippage in the pump system, if there is any port opening at valve 44, for example, at all: and an automatic adjustment occurs by which the torque ratio increases under conditions which are the reverse of those set out above for decrease of such ratio.

In the above description, the differential member 15 has been referred to as a case: and the epicyclic member 61, 62 has been referred to as a spider. These terms are interchangeable: and have been employed for simplicity of description and claiming. Furthermore, it will be noted that the structure includes two differentiating gearings each comprised of two gear members associated with a case or spider carrying planet pinion means in mesh with both gears, so that the three elements may turn or differentiate in their movements with respect to one another. One of these differentiating gearings has its case connected to the driving member and the other has its case connected to the driven member. A gear 19 in one is positively connected with a gear 24 in the other, while the second gears 30, 51 in each are connected through a retarding or braking means (here illustrated as the gear pump 33, 34, 38). Further, one of the two gearings has the overrunning clutch structures 70 operative between its gears; while the other has brake means 90 for holding its second gear 51 against movement relative to the frame. The specifically illustrated embodiment including the internally-cut orbit gear 51 is not limitative; and it will be understood that where "orbit gear" is employed in this specification and claims, this is used synonymously with "sun gear".

It has been indicated above that the ratio of the sun gear 24 to gear teeth 51 may be adjusted to attain the desired torque and speed relationship. It is also possible to control such a relationship by having the sun gears 19, 30 of the first differentiating gearing of properly selected different effective diameters. Thus, in Figure 5 the differential case 15a supports the planet pinions 18a, which are in mesh with a large sun gear 19a and a small sun gear 30a. In this form, the large sun gear 19a is fixed to the shaft 20; while the sun gear 30 is connected to the inner pump gear 33. In this structure, the sun gear 19a is not driven at twice the speed of the differential case 15a when the sun gear 30a is held at a standstill with the pump assembly, and hence a greater multiplication of torque occurs in the system, for a given relationship of the sun gear 24 and gear teeth 51.

Figure 6:
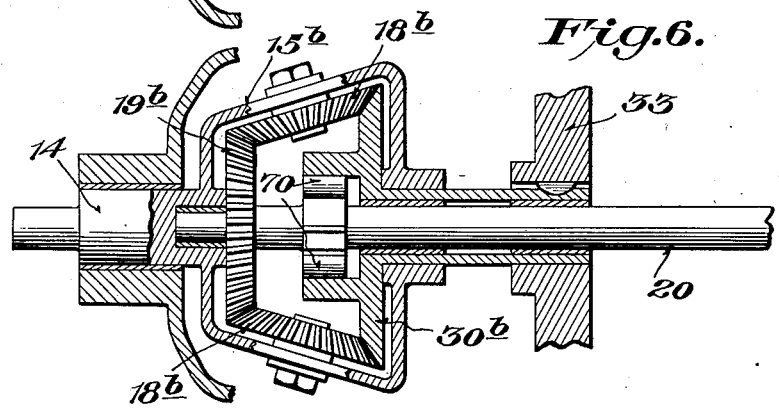

An inverse condition is shown diagrammatically in Fig. 6, where the planet pinions, 18b on the case 15b are in mesh with sun gears 19b and 30b, but with the sun gear 19b smaller than the sun gear 30b. In this case, the torque multiplication is less, with the same assumed relative sizes of parts in the second differentiating gearing.

Figures 7, 8:
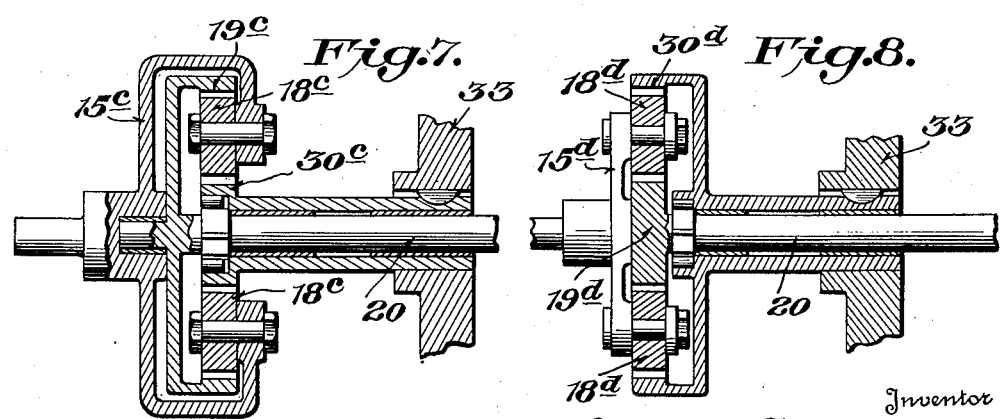

It is likewise possible to construct the first differentiating gearing of strictly epicyclic type, as shown by Figs. 7 and 8.

In the form of Fig. 7 the differential case 15c supports the planet pinions 18c which are located in the same plane and are in mesh with the small sun gear 30c and the large, internally-cut gear 19c. This arrangement of parts corresponds to that of Fig. 5 in producing a greater torque multiplication.

In the form of Fig. 8, the differential case 15d carries the planet pinions 18d which are in mesh with the large gear 30d and the small sun gear 19d.

Figure 5:
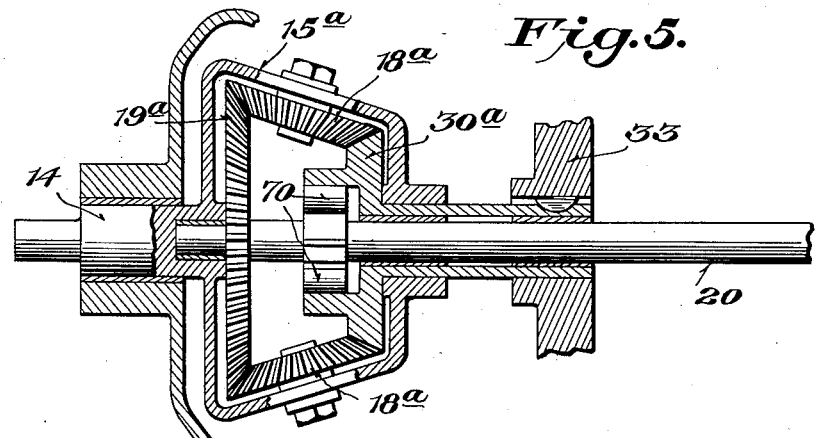

The relative sizes of the sun gears in the first differential gearing are selected according to the requirements of the system. Thus, the forms of Figs. 5 and 7 are advantageous for heavy duty vehicles such as trucks, where a slow acceleration from 1:4 to a 1:2 and then to a 1:1 speed ratio is permissible. With lighter vehicles, such as fast passenger automobiles, the forms of Figs. 6 and 8 provide for rapid accelerations between these particular ratios.

Structurally, the illustrated assembly is advantageous as it provides three compartments in a housing structure, these compartments receiving, in order from the front end, the first differential gearing, the fluid displacement pump structures, and the second differentiating gearing: and permit the employment of closely spaced bearings which are illustrated as of anti-friction type, for permitting the easy movement of the parts in respect to one another and the housing, at points where the parts perform relative movements during conditions of heavy load demand.

This is fluid-controlled mechanically-driven transmission in which maximum loads to be moved respective to the various established gear ratios are actuated through and by a mechanical drive and the hydraulic end is used for the transfer of speed-torque ratios from one to the other.

The transmission can be employed for many purposes in driving stationary machinery and vehicles. It has particular advantages in association with prime movers having a torque characteristic representing a very low torque output at starting and at low speeds, and hence can be employed in automobile service with variable speed engines as well as with prime movers having a substantially constant speed during running, with varying torque output.

It is obvious that the invention is not limited solely to the forms of construction illustrated, but that it may be employed in many ways within the scope of the appended claims.

I claim:

1. A variable ratio transmission comprising a frame, a driving member, a driven member; first and second differentiating gearings, each comprising first and second gears having a common axis, a planet pinion and a differential member revoluble with the planet pinion about the common axis, the said first gears in each differentiating gearing being connected together; a fluid pressure means including two relatively movable parts respectively connected to the said second gears and effective for retarding the relative angular motion of said second gears; one said differential member being connected to the driving member and the other said differential member being connected to the driven member; and braking means for holding one said relatively movable part against movement relative to the frame, and means for applying and releasing said braking means.

2. A variable ratio transmission comprising a frame; first and second differentiating gearings, each comprising first and second gears, a planet pinion and a differential member revoluble with the planet pinion; means connecting said first gears together, means for driving the differential member in one differentiating gearing, and means for connecting the differential member of the other differentiating gearing to a load; first retarding means connected to said second gears and cooperative for preventing relative movement thereof, further retarding means for preventing relative movement of one said second gear relative to the frame, and means for regulating the effects of said retarding means.

3. A variable ratio transmission as in claim 2, in which said first retarding means comprises a fluid pressure pump and its regulating means comprises a valve for determining the back pressure at said pump.

4. A variable ratio transmission comprising a frame, a driving member, a driven member; a first differential gearing having a pair of coaxial gears, a differential case and a planet pinion, said differential case being connected to the driving members; a second differential gearing having a pair of coaxial gears, a spider and planet pinion means, said spider being connected to the driven member; one said gear in each differential gearing being connected together, means for preventing the other gear in one differential gearing from turning faster than said one gear thereof, brake means comprising parts on the frame and parts on the other gear of the other differential gearing for preventing said other gear from turning relative to the frame, and means for actuating said brake means; a gear pump having two relatively rotatable parts, one of said parts being connected to the said other gear in one differential gearing and the other said part being connected to the said other gear in the other differential gearing; and means for establishing a variable back pressure in said gear pump.

5. A variable ratio transmission as in claim 4, in which said back pressure establishing means includes conduit means for liquid circulation through the gear pump, and a valve in said conduit means for limiting the liquid delivery from said pump.

6. A variable ratio transmission as in claim 4, in which said back pressure establishing means includes conduit means for liquid circulation through the gear pump, a valve in said conduit means for limiting the liquid delivery from said pump, and regulatable air bleeder means for delivering air to the pump intake.

7. A variable ratio transmission comprising a frame, a driving member, a driven member; first and second differentiating gearings each comprising first and second gears having a common axis, a planet pinion and a differential member revoluble with the planet pinion about the common axis, the said first gears in each differentiating gearing being connected together, and fluid pressure means including two relatively movable parts respectively connected to the said second gears and effective for retarding the relative angular motion of said second gears; one said differential member being connected to the driving member and the corresponding said first and second gears being of the same size, the other said differential member being connected to the driven member and the corresponding said first and second gears being of different sizes; and brake devices including parts on the frame and parts on the larger of the said gears of the other said differentiating gearing for preventing movement of said larger gear relative to the frame.

8. A variable ratio transmission comprising a frame, a driving member, a driven member; first and second differentiating gearings each comprising first and second gears having a common axis, a planet pinion and a differential member revoluble with the planet pinion about the common axis, the first said gears in each differentiating gearing being connected together, both said differentiating gearings having their gears of different sizes, the large gear in the first differential being connected to the small gear in the second differential, and fluid pressure means including two relatively movable parts respectively connected to the said second gears and effective for retarding the relative angular motion of said second gears; the differential member of said first differentiating gearing being connected to the driving member and the differential member of the second differentiating gearing being connected to the driven member; and brake devices including parts connected to the frame and parts connected to the large gear of said second differentiating gearing and effective for preventing movement of said large gear relative to the frame.

9. A variable ratio transmission comprising a frame, a driving member, a driven member; first and second differentiating gearings each comprising first and second gears having a common axis, a planet pinion and a differential member revoluble with the planet pinion about the common axis, the said first gears in each differentiating gearing being connected together, each differentiating gearing having its gears of different sizes, the small gears of the two gearings being connected together, and fluid pressure means including two relatively movable parts respectively connected to the said large gears and effective for retarding the relative angular motion of said other gears; one said differential member being connected to the driving member and the other said differential member being connected to the driven member; and brake devices including a part connected to the frame and a part connected to the large gear of said second differentiating gearing and effective for preventing movement of said large gear relative to the frame.

10. A variable ratio transmission comprising a housing, a driving member, a driven member; a first differential including first and second gears, a differential case, and a planet pinion journalled on the differential case; a fluid displacement pump including a pump housing, an inner pump gear, and a pump pinion journalled in the pump housing in mesh with the pump gear; a second differential including large and small gears, a spider and a planet pinion journalled on the spider; a first overrunning clutch effective between said first and second gears for preventing said second gear from turning faster than said first gear, a brake effective between said large gear and the frame for preventing said large gear from rotating relative to the frame; and means for controlling the flow of fluid through said pump so that the back pressure thereat may be varied; said driving member being connected to said differential case, said first gear being connected to said small gear, said second gear being connected to said pump gear, said pump housing being connected to said large gear, said spider being connected to the driven member.

11. A variable ratio transmission including a frame, a driving member, a driven member; a first differentiating gearing connected to the driving member; means for limiting the relative movement of parts of said first gearing; a second differentiating gearing connected to the driven member and including gears of different sizes; means mechanically connecting parts of said differentiating gearings in driving relation; further means including brake devices connecting other parts of said differentiating gearings, and devices for controlling the braking effect; and releasable means for preventing the movement of said other parts in said second gearing relative to the frame.

12. A variable ratio transmission including a frame, a driving member, a driven member; a first differentiating gearing including first and second gears, a planet pinion, and a differential case connected to the driving member; means for limiting the relative movement of said gears in the first gearing; a second differentiating gearing including small and large gears, a planet pinion and a differential spider connected to the driven member; said first and small gears being connected together; releasable means for preventing the movement of said large gear relative to the frame; and variable brake means for restricting the relative movement of said second and large gears.

OTTO E. SZEKELY.